(12) United States Patent
Van der Hoeven (10) Patent No.: US 7,555,732 B2
(45) Date of Patent: Jun. 30, 2009

(54) APPARATUS METHOD AND SYSTEM FOR A DATA ENTRY INTERFACE

(75) Inventor: Steven Van der Hoeven, 7/9 Avenue de Grande Bretagne, 98000 Monaco (BE)

(73) Assignee: Steven Van der Hoeven, Monaco (BE)

( * ) Notice: Subject to any disclaimer, the term of this patent is extended or adjusted under 35 U.S.C. 154(b) by 666 days.

(21) Appl. No.: 10/800,204

(22) Filed: Mar. 12, 2004

(65) Prior Publication Data

US 2005/0200609 A1    Sep. 15, 2005

(51) Int. Cl.
*G06F 3/033* (2006.01)
(52) U.S. Cl. .................. 715/863; 345/168; 345/169
(58) Field of Classification Search ............ 345/863, 345/168, 169; 341/20, 22, 23; 715/780, 715/863; 400/472, 485, 488, 489
See application file for complete search history.

(56) References Cited

U.S. PATENT DOCUMENTS

| | | | |
|---|---|---|---|
| 4,067,431 A * | 1/1978 | Whitaker | 400/485 |
| 4,481,508 A | 11/1984 | Kamei et al. | |
| 4,544,276 A | 10/1985 | Horodeck | |
| 4,969,097 A | 11/1990 | Levin | |
| 5,059,048 A * | 10/1991 | Sirkin | 400/486 |
| 5,067,103 A | 11/1991 | Lapeyre | |
| 5,087,910 A | 2/1992 | Guyot-Sionnest | |
| 5,109,352 A | 4/1992 | O'Dell | |
| 5,128,672 A | 7/1992 | Kaehler | |
| 5,187,480 A | 2/1993 | Thomas et al. | |
| 5,255,310 A | 10/1993 | Kim et al. | |
| 5,388,061 A | 2/1995 | Hankes | |
| 5,410,306 A | 4/1995 | Ye | |
| 5,486,058 A * | 1/1996 | Allen | 400/485 |
| 5,488,363 A | 1/1996 | Peng | |
| 5,535,421 A | 7/1996 | Weinreich | |
| 5,713,033 A | 1/1998 | Sado | |

(Continued)

FOREIGN PATENT DOCUMENTS

DE     10012671 A1    9/2001

(Continued)

OTHER PUBLICATIONS

International Search Report and Written Opinion for PCT/IB2005/000614, Sep. 21, 2005.

(Continued)

*Primary Examiner*—William L. Bashore
*Assistant Examiner*—Meseker Takele
(74) *Attorney, Agent, or Firm*—Sprinkle IP Law Group (57) ABSTRACT

Apparatuses, methods and systems for the efficient entry of data on a device with a restricted set of input channels are disclosed. These apparatuses, systems and methods may employ a user interface which allows efficient entry of input. This interface may be tailored according to the device with which it is used, and the semantic meaning associated with the interface. To assist in the efficient entry of data, these apparatuses, systems and methods may disambiguate user input, provide an efficient way to specify the input exactly, or predict user input. These apparatuses, systems and methods may also adapt to the proclivities of a certain user, and incorporate user defined abbreviations and synonyms for frequently used inputs.

24 Claims, 5 Drawing Sheets

U.S. PATENT DOCUMENTS

| | | | |
|---|---|---|---|
| 5,724,031 | A | 3/1998 | Huang |
| 5,786,776 | A | 7/1998 | Kisaichi et al. |
| 5,847,697 | A | 12/1998 | Sugimoto |
| 5,881,169 | A | 3/1999 | Henry, Jr. |
| 5,936,556 | A | 8/1999 | Sakita |
| 5,945,928 | A | 8/1999 | Kushler et al. |
| 5,984,548 | A * | 11/1999 | Willner et al. ............. 400/472 |
| 6,005,498 | A | 12/1999 | Yang et al. |
| 6,037,942 | A | 3/2000 | Millington |
| 6,054,941 | A | 4/2000 | Chen |
| 6,075,469 | A | 6/2000 | Pong |
| 6,098,086 | A | 8/2000 | Krueger et al. |
| 6,104,317 | A * | 8/2000 | Panagrossi ................... 341/20 |
| 6,172,625 | B1 | 1/2001 | Jin et al. |
| 6,184,803 | B1 | 2/2001 | Burrell, IV |
| 6,204,848 | B1 | 3/2001 | Nowlan et al. |
| 6,286,064 | B1 * | 9/2001 | King et al. ................... 710/67 |
| 6,295,052 | B1 | 9/2001 | Kato et al. |
| 6,307,548 | B1 | 10/2001 | Flinchem et al. |
| 6,346,894 | B1 | 2/2002 | Connolly et al. |
| 6,349,147 | B1 | 2/2002 | Pong et al. |
| 6,362,752 | B1 | 3/2002 | Guo et al. |
| 6,370,518 | B1 | 4/2002 | Payne et al. |
| 6,377,685 | B1 | 4/2002 | Krishnan |
| 6,378,234 | B1 * | 4/2002 | Luo ............................ 341/22 |
| 6,437,709 | B1 | 8/2002 | Hao |
| 6,460,015 | B1 | 10/2002 | Hetherington et al. |
| 6,498,608 | B1 | 12/2002 | Dresevic et al. |
| 6,525,676 | B2 | 2/2003 | Kisaichi et al. |
| 6,542,170 | B1 | 4/2003 | Williams et al. |
| 6,562,078 | B1 | 5/2003 | Yang et al. |
| 6,603,489 | B1 | 8/2003 | Edlund et al. |
| 6,636,162 | B1 | 10/2003 | Kushler et al. |
| 6,646,573 | B1 | 11/2003 | Kushler et al. |
| 6,662,025 | B1 | 12/2003 | Bond et al. |
| 6,860,661 | B1 * | 3/2005 | Daoud ........................ 400/488 |
| 6,972,749 | B2 * | 12/2005 | Hinckley et al. ............. 345/173 |
| 2002/0027549 | A1 * | 3/2002 | Hirshberg ................... 345/168 |
| 2002/0087605 | A1 | 7/2002 | Su et al. |
| 2002/0110237 | A1 | 8/2002 | Krishnan |
| 2003/0067495 | A1 | 4/2003 | Pu et al. |
| 2003/0222800 | A1 | 12/2003 | Uke |
| 2003/0234821 | A1 | 12/2003 | Pugliese |
| 2004/0004558 | A1 | 1/2004 | Fux |
| 2004/0008129 | A1 | 1/2004 | Philipp |
| 2006/0055669 | A1 * | 3/2006 | Das ............................ 345/156 |
| 2006/0119582 | A1 * | 6/2006 | Ng et al. ..................... 345/168 |

FOREIGN PATENT DOCUMENTS

| | | |
|---|---|---|
| GB | 2195040 A | 3/1988 |
| WO | WO 02/095524 A2 | 11/2002 |

OTHER PUBLICATIONS

Clearly, et al., "A Comparison of Enumerative and Adaptive Codes," IEEE Transactions on Information Theory, vol. IT-30, No. 2, Mar. 1984, pp. 306-315.

Clearly, et al., "Data Compression Using Adaptive Coding and Partial String Matching," IEEE Transactions on Communications, vol. Com-32, No. 4, Apr. 1984, pp. 396-402.

\* cited by examiner

APPARATUS METHOD AND SYSTEM FOR A DATA ENTRY INTERFACE

RELATED APPLICATIONS

This application is related to U.S. patent application Ser. No. 10/800,203 entitled "Method and System for Disambiguation and Predictive Resolution" by Van der Hoeven filed of an even date. All applications cited within this paragraph are fully incorporated herein by reference.

TECHNICAL FIELD OF THE INVENTION

The invention relates in general to data entry, and more particularly, to interfaces and logic for the efficient entry of data into devices.

BACKGROUND OF THE INVENTION

Since the dawn of the computer age one of the most steady and continuous trends has been toward miniaturization. This trend manifests itself in every facet of the industry. Cell phones, personal digital assistants (PDAs), portable computers etc. have all decreased in size at astounding rates. Conversely, however, as these devices have shrunk they have also become more powerful. This dichotomy is somewhat problematic. The need to communicate information to, and glean information from, a user increases commensurately with the power of a device, while the real estate available for these display and data entry interfaces naturally shrinks along with the device.

With each of the two subsystems of data entry and display, there are inherent physical limitations on possible size reduction before each subsystem becomes either ineffective or useless. The physical limitations placed on communications to a user are much greater than those placed on an interface for data entry. These limitations may include hardware limitations, physiological limitations, and the fact that, in most cases, data must be communicated to a user visually. Therefore, the majority of a device's footprint reserved for communications and data entry may be taken up by a visual display. This visual display leaves little room for an interface for data entry.

Solutions to address this problem have been devised by incorporating handwriting software in a device. To utilize this solution, a user may directly enter text by writing on a touch sensitive display. This handwritten data is then converted by handwriting recognition software into digital data. While this solution allows one display to both communicate information to, and receive data from, a user, the accuracy and speed of handwriting recognition software is notoriously bad. Additionally, printing or writing with a stylus is generally slower than typing, or key based input, and requires the use of two hands.

Figure 1:
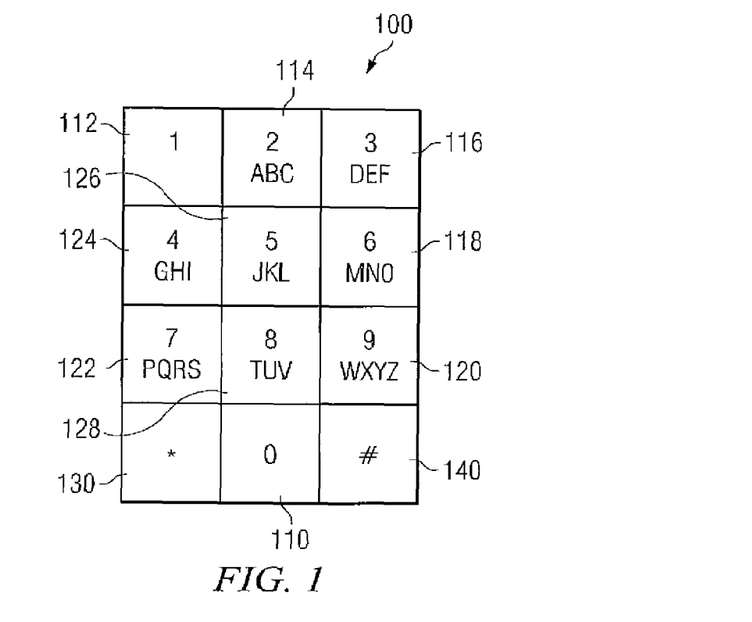
FIG. 1 includes an illustration of a prior art reduced keypad.

It is therefore advantageous to use an interface for entering data which is small and may be operated with one hand. Prior attempts at such a keyboard have resulted in the development of a keyboard that has a reduced number of keys. FIG. 1 shows a prior art reduced keypad 100 for a device. The keypad 100 is a standard telephone keypad having ten number keys 110-128 an asterisk (*) key 130, and a pound (#) key 140. For English, and many other alphabet languages, the numeric keypad of the telephone is overlaid with an alphabet keypad where three letters are associated with each number key 110-128. For example, the two (2) key 114 is associated with the letters a-b-c. With some of these reduced key devices, a user may employ multiple key presses to enter words or names.

However, this solution is problematic as well, as Chinese and other character based languages such as Japanese kanji do not have a manageable number of letters which can be overlaid onto a numeric keypad. An additional problem is that each key press may contain multiple characters, creating ambiguity in a sequence of keystrokes.

A solution to the problem of ambiguity is to have the user enter two or more keystrokes to specify each letter, the keystrokes may be entered simultaneously (chording) or in sequence. However, these approaches require many keystrokes and are consequently inefficient. Ideally, a data entry method would require one keystroke per letter.

In the past, word level disambiguation has been used to disambiguate entire words by comparing the sequence of received keystrokes with possible matches in a dictionary. But, because of decoding limitations, word level disambiguation does not give error free decoding of unconstrained data with an efficiency of one keystroke per character.

Thus, there is a need for apparatuses, methods and systems for interfaces which enable the efficient one-handed entry of a variety of data, and the ability to reduce the number of strokes required for data entry by using logic for the resolution of character ambiguity and the predictive completion of input.

SUMMARY OF THE INVENTION

Apparatuses, methods and systems for the efficient input of text on a device with a restricted set of input channels are disclosed. These apparatuses, systems and methods may employ a user interface which allows efficient one handed operation by using a key layout that may be manipulated by the thumb of a single hand. This interface may be tailored to the specific device on which it is utilized, and in some instances multiple characters may be associated with each key or portion of a key. To assist in the efficient entry of data, these apparatuses, systems and method may disambiguate user input in the case where data entered by the user may have several interpretations, provide an efficient way to specify the input exactly, or predict user input and submit these predictions to the user. These predictive systems and methods may also adapt to the proclivities of a certain user, and incorporate abbreviations, translations, and synonyms for frequently used inputs.

In one embodiment, an initial press is detected, a release is detected, and movement between the press and release is detected utilizing a set of zones; the initial press, release and movement are then normalized into a discrete message.

In other embodiments, the set of zones comprises a set of interkey zones and a set of key zones, wherein no two key zones are contiguous, and each key zone is contiguous with at least one interkey zone.

In yet other embodiments, the set of zones is arranged in a set of rows.

In still other embodiments, each row has a key zone at each end, and there is an interkey zone between each key zone in the row.

In another embodiment, each interkey zone overlaps with at least the two adjacent key zones with which it is contiguous.

In still another embodiment, every part of each interkey zone is associated with one of the at least two adjacent key zones with which it is contiguous.

In some embodiments, a semantic meaning is associated with the discrete message.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification.

The term "character" is intended to mean any symbol whatsoever, a character may be a letter, a diacritical mark, a portion of a kanji, any symbol with a connotation in the art of writing and printing, etc.

The term "key" is intended to mean a zone of an interface, responsive to a user action, including touch. Semantic meaning may be associated with a key or portions of a key, this semantic meaning may consist of one or more characters or control information.

The term "keyboard" is intended to mean a grouping of keys.

The term "prediction" is intended to mean the results of an attempt to predict the completion of a sequence of symbols. This prediction may be based on any type of system, including probabilistic, mathematical, linguistic, or any other.

The term "synonym," as used with respect to a use model, is intended to mean a possible alternative to a prediction. These synonyms may be associated with the prediction, and may be stored in a data structure corresponding to a prediction, or the terminal node corresponding to a prediction.

The term "proposition" is intended to mean a sequence of one or more characters, or a set of these sequences.

The term "prefix" is intended to mean a sequence of one or more characters which may or may not be extended with a user input, the results of disambiguation or prediction etc.

The term "candidate" is intended to mean a sequence of one or more characters and an associated score. This score may be based on any model including probabilistic, mathematical, linguistic, or any other.

The term "active zone" is intended to mean a zone of an interface which is designated to be part of an interface used to receive input from a user.

The term "zone" is intended to mean an area of an interface or within the purview of a sensor.

The term "ambiguous" is intended to mean that something may have several possible meanings.

The term "completion" is a set of symbols which may form a desired final or intermediate sequence of symbols when concatenated with an initial set of symbols (usually referred to as prefix). In many circumstances a completion may have been calculated to have a high probability of forming the desired final or intermediate sequence.

The term "send a message" is intended to mean transmission or exchange or utilization of information. It is important to note that no assumption may be made about how a message is sent, or even if the sending of a message is necessary in any particular embodiment.

The term "sequence" is intended to mean a finite number of elements with a notion of order. A set may be empty or contain only one element. This is a definition commonly accepted in mathematics. We note it as $(e_1, \ldots, e_n)$ The term "set" is intended to mean a finite number of elements with no notion of order. A set may be empty or contain one element. This is a definition commonly accepted in mathematics. We note it as $\{e_1, \ldots, e_n\}$.

The term "type" is intended to mean a range of values or classes. Typing a variable or a value is to enumerate it, or specify the values or classes it may be. Typing an element E with a type T is written as followed: "E:T".

The term "structure" is intended to mean an ordered set of elements $(e_1, \ldots, e_n)$. Each element $e_i$ may be typed with the type $t_i$. The type of the structure is then the sequence $(t1, \ldots, tn)$.

The term "field" is intended to mean an element of a structure. Fields can be named. P(e:t) implies the structure P has a field e of type t. If p is of type P (as above), p.e represents the field of the element p.

Attention is now directed to apparatuses, methods and systems for the efficient input of text on a device with a restricted set of input channels. These apparatuses, systems and methods may employ a user interface which allows efficient one handed operation by using a key layout that may be manipulated by the thumb of a single hand. This interface may be tailored to the specific device on which it is utilized, and in some instances, multiple characters may be associated with each key or portion of a key. To assist in the efficient entry of data, these apparatuses, systems and methods may disambiguate the user input from these keys in the case where data entered by the user may have several interpretations, or may provide an efficient way for a user to specify the input exactly. These systems and methods may also predict user input and submit these predictions to the user so they may be selected by the user, instead of requiring the user to enter the entire text manually. These predictive systems and methods may also adapt to the proclivities of a certain user, and incorporate user defined abbreviations and synonyms for frequently used inputs.

In an illustrative embodiment of the invention, the computer-executable instructions may be lines of assembly code or compiled C++, Java, or other language code. Other architectures may be used. Additionally, a computer program or its software components with such code may be embodied in more than one computer system readable medium in more than one computer.

Figure 2:
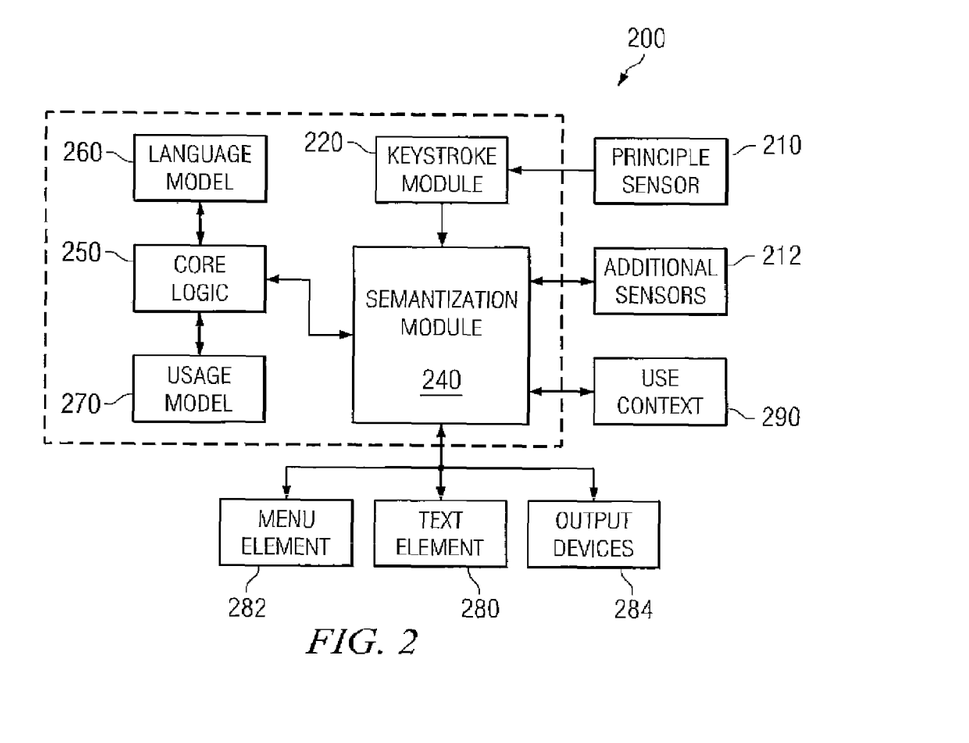
FIG. 2 includes a representation of one possible architecture for implementing the disclosed systems and methods.

Turning now to FIG. 2, one embodiment of an architecture 200 for implementing and organizing the apparatuses, methods and systems disclosed is presented. After reading this specification, skilled artisans will appreciate that many other architectures may be utilized with embodiments of the present invention. In one embodiment, these architectures include principal sensor 210, additional sensors 212, keystroke module 220, semantization module 240, core logic 250, language model 260 and usage model 270. Keystroke module 220 may receive data from principle sensor 210. Keystroke module 220 processes this data and sends the results to semantization module 240. Semantization module 240 takes the results from keystroke module 220 and from any additional sensors 212. Semantization module 240 may then process this data to formulate data for use by core logic 250 using use context 290, text element 280, menu element 282 and output devices 284. Core logic 250 may resolve ambiguity or predictively complete a user's input using input from semantization module 240, language model 260 or usage model 270. Core logic 250 may present its results to semantization module 240. Semantization module may then output results through a combination of use context 290, text element 280, menu element 282 and output devices 284.

In general, this architecture is designed to enhance a user's ability to input data on a device by allowing a wide variety of configurations for an input device, including a configuration designed for use by the thumb of one hand. Embodiments may also disambiguate input, allow a user an efficient way to unambiguously specify the exact input, and submit predictive completions to a user in order to avoid additional manual input. A person of ordinary skill in the art will realize, after reading this disclosure, that this architecture is presented for descriptive purposes only; and that all the functionality described may be embodied in a wide variety of ways, including with more or fewer modules, with messages or without messages being passed, in software, in hardware, etc.

In specific embodiments, a user's actions are captured by sensors 210, 212 and reported to the semantization module 240. In some embodiments, information from principle sensor 210 may be processed by keystroke module 220 before being reported to semantization module 240. Semantization module 240 may be the only interface to a user, and may be responsible for translating and formatting all incoming and outgoing messages. The translation of semantization module 240 may be context dependent or may provide parameterization for integration into a system. Core logic 250 may contain rules for managing the interaction between semantization module 240 and a user, including prediction of user input and resolution of ambiguity.

Core logic 250 may use data structures, including language model 260 for disambiguating user input, and user model 270 to predict user input. Text element 280, menu element 282, and other optional output devices 284 may be used by semantization module 240 to show the results of its logic or the state of the system. Text element 280 may be a data entry interface whereby a user may insert or input a sequence of symbols, or extend an existing sequence of symbols, and through which a sequence of symbols may be displayed.

In one particular embodiment, text element 280 is the device by where a user may insert a sequence of symbols or extend an existing sequence. Text element 280 can send a message (EditText) to the system or semantization module 240, containing information on a possible prefix or other user input text. Text element 280 then receives a SubstituteText message from semantization module 240 containing a sequence of symbols (S) in response to the EditText message. Text element 280 may also receive a EndEdit message, signaling the completion of the EditText message when a user has finished entering a sequence of symbols. When text element 280 receives this SubstituteText message, text element 280 may respond accordingly. If it is the first SubstituteText received since the last EditText was sent and the last EditText had a prefix, the SubstituteText argument is substituted for the sequence of symbols relative to the prefix in text element 280, which is then displayed to the user. If this is the first SubstituteText received since the last EditText was sent, and the last EditText had no prefix, text element 280 may just insert the SubstituteText argument in the sequence displayed to the user. For two consecutive SubstituteText messages without an EndEdit between them, it replaces the text of the first SubstituteText messages by the argument of the second and displays the information to the user.

Menu element 282 may present user with a series of choices or options, depending on an output or state of the system. Menu element 282 can be combined with text element 280 in certain embodiments. Menu element 282 may display a list of choices or a tree of choices, for selection by a user. Menu element 282 may receive SetMenu messages from semantization module 240 containing an argument. This argument may be a flat list of choices when the menu is a list, or an argument referring to the position of choices in a tree or a nested list of choices, in the case of a tree menu. The choices may be sequences of symbols or constants. When the user selects a choice from the list presented, a SelectItem message may be sent to semantization module 240 with the value of the choice as an argument.

Use context 290 may control properties and layouts of sensors 210, 212 and notify the user of certain events. In one embodiment, use context 290 may use a TextInputQuery to prepare text element 280 or menu element 282 for interaction with a user. Text element 280 can respond to by emitting an EditText message with a QueryFlag to semantization module 240, indicating that text element 280 is ready for editing.

Use context 290 may also be aware when text editing is performed in text element 280 through the interception of StartEdit messages when editing starts, or EditStop message when editing stops. Use context 290 may also control various properties of principle sensor 210, and notify a user of certain events.

These events are triggered through a UserNotify message which may contain information about the type of notification. The system may interpret the action to undertake for each type of notification. This interpretation may be done by semantization module 240.

Principle sensor 210 may monitor a set of variables in an environment and send the results through discrete messaging to keystroke module 220. Additionally, principle sensor 210 may be capable of detecting actions of a user, which may consist of a user designating a particular area within the range of principle sensor 210, a sequence of movements made by a user, and the user's cessation of movement. These actions usually involve direct physical contact between a user and the sensor, indirect contact through the use of a tool, such as a stylus, pen, etc. or methods not involving physical contact such as eye movements, laser pointer, etc. Those of ordinary skill in the art will realize that a wide variety of options exist for implementing principle sensor 210. Examples of these options include eye tracking systems, touch screens, joysticks, graphical user interfaces, traditional keyboards in all their electronic or mechanical forms and the like. Similarly, these sensing device(s) may be implemented in hardware, software, or a combination of the two. It will also be apparent, after reading this disclosure, that a wide variety of layouts may be utilized with principle sensor 210 to provide an interface for data entry.

Figure 3:
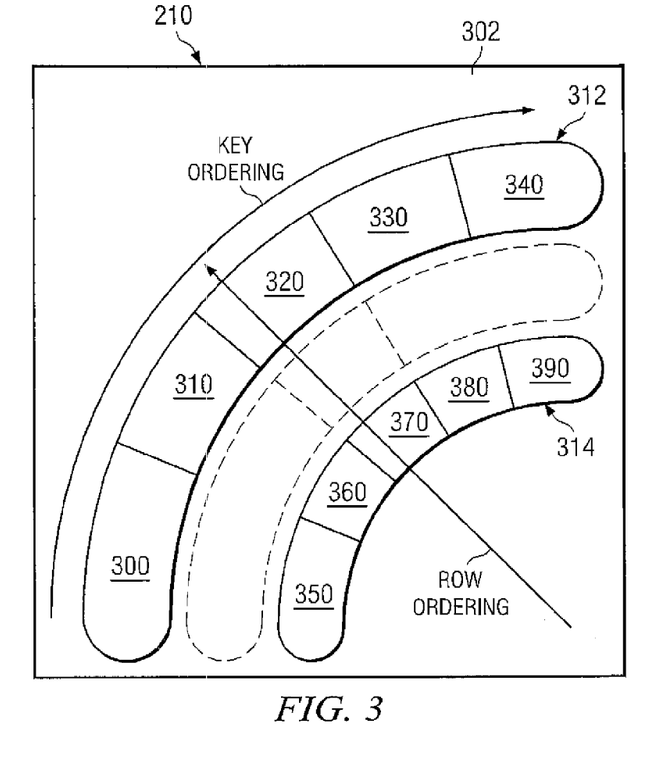
FIG. 3 includes a representation of one embodiment of a layout for employing zones with a principle sensor.

Before delving into the interaction of the components of architecture 200, one example of a layout for use with a type of principle sensor 210 which may detect contact is presented in FIG. 3. Within principle sensor 210, a set of non-overlapping zones 300-390 may be defined. These zones 300-390 may be key zones 300, 310-390 designed to aid interaction with a user. These key zones 300, 310-390 may be arranged along one or more rows 312, 314, each row containing one or more of key zones 300, 310-390 and the rows may in turn be arranged in concentric curves. The zone which lies outside of the rows 312, 314 of key zones 300, 310-390 is nokey zone 302. Each key zone 300 310-390 is associated with a unique identifier, the unique identifier representing the ordering of the key zones 300, 310-390 by means of a key zone's 300, 310-390 position among the rows and between the rows.

For example, rows 312, 314 may be numbered from smallest to larges starting with the innermost row. In the example depicted in FIG. 3, row 314 would be row number 1 while row 312 would be row number 2. Key zones 300, 310-390 may also be ordered within their respective rows. In FIG. 3, numbers may be assigned to key zones 300, 310-390 from left to right, consequently zones 300, 350 may be numbered 1, zones 320, 360 number 2 and so on. Using these row and zone orderings, a unique identifier may be assembled for each zone implemented utilizing principle sensor 210. In the current example, key zone 300 would be (2,1), key zone 350 may be identified as (1,1), key zone 360 as (1,2) etc. As can be easily seen by those of ordinary skill, many schemes may be utilized to uniquely identify the set of zones 300-390 within principle sensor 210, and these zones 300-390 may be defined in a variety of topologies which may be suited to the size of a particular sensor, device, user or any other criteria.

Principle sensor 210 may monitor the environment and determine a pointed zone or contact zone where contact is being made by a user. This pointed zone may consist of only the point or location where contact is made or may consist of a defined area surrounding the location of actual contact. When contact is made, principle sensor 210 may determine if zones 300-390 overlap the pointed zone. For each zone 300-390 which overlaps the pointed zone, principle sensor 210 sends a message to keystroke logic 220. Each message may be a message which identifies the start of contact (StartContact) and the respective unique identifier for the overlapping zone 300-390. When the pointed zone is moved, and begins to overlap any other zone 300-390, a message is sent to keystroke logic 220 indicating a zone 300-390 has been entered along with the unique identifier of that zone 300-390. When the contact ceases, principle sensor 210 senses that contact has been stopped, and indicates this to keystroke module 220 (StopContact). Therefore, principle sensor can sense a start of contact, movement of this contact, and release of the contact. Messages of this type may be exchanged between principle sensor 210 and keystroke module 220 using a message of the type described above. It is to be noted that though all types of contact may be determined by principle sensor 210, messages regarding all of them may not be passed to keystroke module 220, or used in evaluating the user's contact.

Zones 300-390 may be designated as active or inactive depending on the layout of zones 300-390, the user's specification, the semantic meaning associated with zones 300-390 etc. When a zone 300-390 is designated as inactive, principle sensor 210 may not compare the area of principle sensor corresponding with the inactive zone with the pointed zone, and therefore no messages containing the inactive zone's unique identifier will be sent to keystroke logic 220. Similarly, a comparison may be made but no messages containing the inactive zone's unique identifier will be sent to keystroke logic 220.

Keystroke logic 220 may serve to differentiate series of start/stop contact messages from principle sensor 210. Keystroke logic 220 may take the messages generated from principle sensor 210 and interpret these messages to determine the row number of a key zone 300, 310-390 in which contact is being made, and the number of the key zone 300, 310-390 in the row. Additionally, a key zone 300, 310-390 may be triggered in several modes depending on the movement of a user's contact or the user's release point, and keystroke logic may also determine the mode in which a key zone 300, 310-390 is triggered. These modes may be denoted by KeyCenter, KeyLower, KeyUpper, RowLower and RowUpper. These messages may correspond to the release point of a user, in relation to where contact by a user originally began.

In one embodiment, messages from principle sensor 210 may be processed according to the following algorithm.

If the StartContact location is nokey, the keystroke module waits for the next StartContact message without any other activity.

There are two variables: Row and Key. Each can take the values: Upper, Lower and Same For each StartContact ($k_{r1, n1}$) (where r1 is the row to which the key belongs, and n1 is the key number in the row):
  Set the Row to Same and Key to Same.
  Then for each EnterZone ($k_{r2, n2}$)
    If r2>r1 set Row to Upper
    If r2<r1 set Row to Lower
    If r2=r1:
      Set Row to Same and
        If r2>n1 set Key to Upper
        If r2<n1 set Key to Lower
        If r2=n1 set Key to Same
  For StopContact:
    If Row is equal to same:
      If Key is equal to Same emit Input (r1, n1, KeyCenter)
      If Key is equal to Lower emit Input (r1, n1, KeyLower)

If Key is equal to Upper emit Input (r1, n1, KeyUpper)
If Row is equal to lower emit Input (r1, n1, RowLower)
If Row is equal to upper emit Input (r1, n1, RowUpper)

Figure 4:
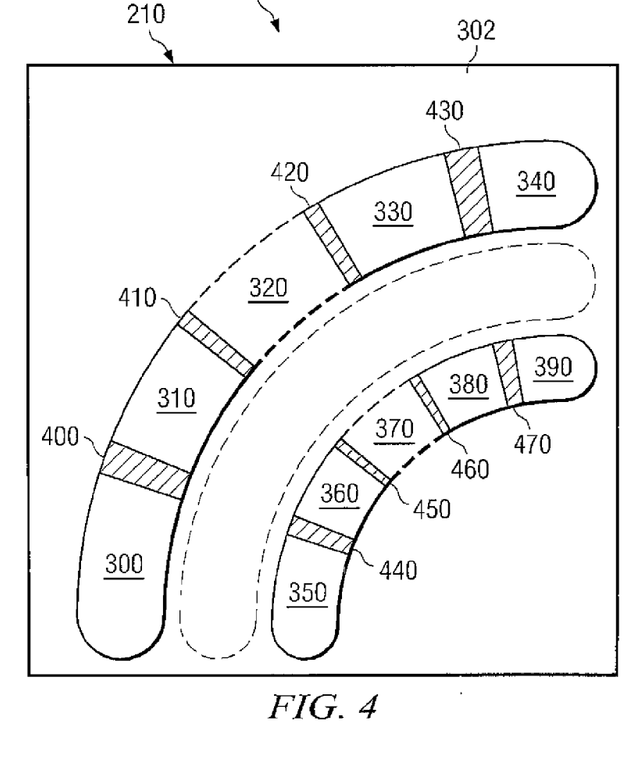
FIG. 4 includes another representation of an embodiment of a layout for employing zones with a principle sensor.

Turning now to FIG. 4, another layout for use with embodiments of principle sensor 210 is depicted. While the layout described with respect to FIG. 3 is perfectly adequate, when many zones 300-390 are present it may be difficult to determine the location of a user contact when the contact is close to the border of two zones. To remedy this difficulty, layout 400 on principle sensor 210 may include interkey zones 400-470 to implement a latching mechanism. Interkey zones 400-470 may be interleaved with key zones 300, 310-390 such that no two key zones 300, 310-390 are contiguous. These interkey zones 400-470 may also have unique identifiers, and principle sensor 210 may sense when contact takes place in an interkey zone 410-470 and send a corresponding message to keystroke logic 220. When interkey zones 400-470 are present the messages from principle sensor 210 may be processed according to the following algorithm.

The row number x is now constituted of zones with the labels: $(k_{x,1}, i_{x,1}, k_{x,2}, i_{x,2}, \ldots, i_{x,y-1}, k_{x,y})$, where y is the number of keys of row number x. If the StartContact location is nokey or an interkey zone, the keystroke module waits for the next StartContact message without any other activity.
For each StartContact $(k_{r1,n1})$:
Set Row to Same and Key to Same
For each EnterZone $(i_{r2,n2})$
   If r2=r1 then
      If n2<n1-1 set Row to Same and Key to Lower
      If n1>n1 set Row to Same and Key to Upper
   If r2<r set Row to Lower
   If r2>r set Row to Upper
For each EnterZone $(k_{r2,n2})$
   If r2=r1 then
      If n2=n1 set Row to same and Key to Same
      If n2<n1 set Row to same and Key to Lower
      If n2>n1 set Row to same and Key to Upper
   If r2<r1 set Row to Lower
   If r2>r1 set Row to Upper
For the first StopContact
   If Row is equal to same
      If Key is equal to Same emit Input (r1, n1, KeyCenter)
      If Key is equal to Lower emit
         Input(r1, n1, LeyLower)
      If Key is equal to Upper emit
         Input(r1, n1, KeyUpper)
   If Row is equal to Lower emit Input(r1, n1, RowLower)
   If Row is equal to Upper emit Input (r1, n1, RowUpper)

It will be readily apparent to those of ordinary skill in the art that interkey zones may be employed to implement a latching mechanism between any two zones or sets of zones. For example, an interkey zone may be employed to implement a latching mechanism between rows 312, 314.

Figure 5:
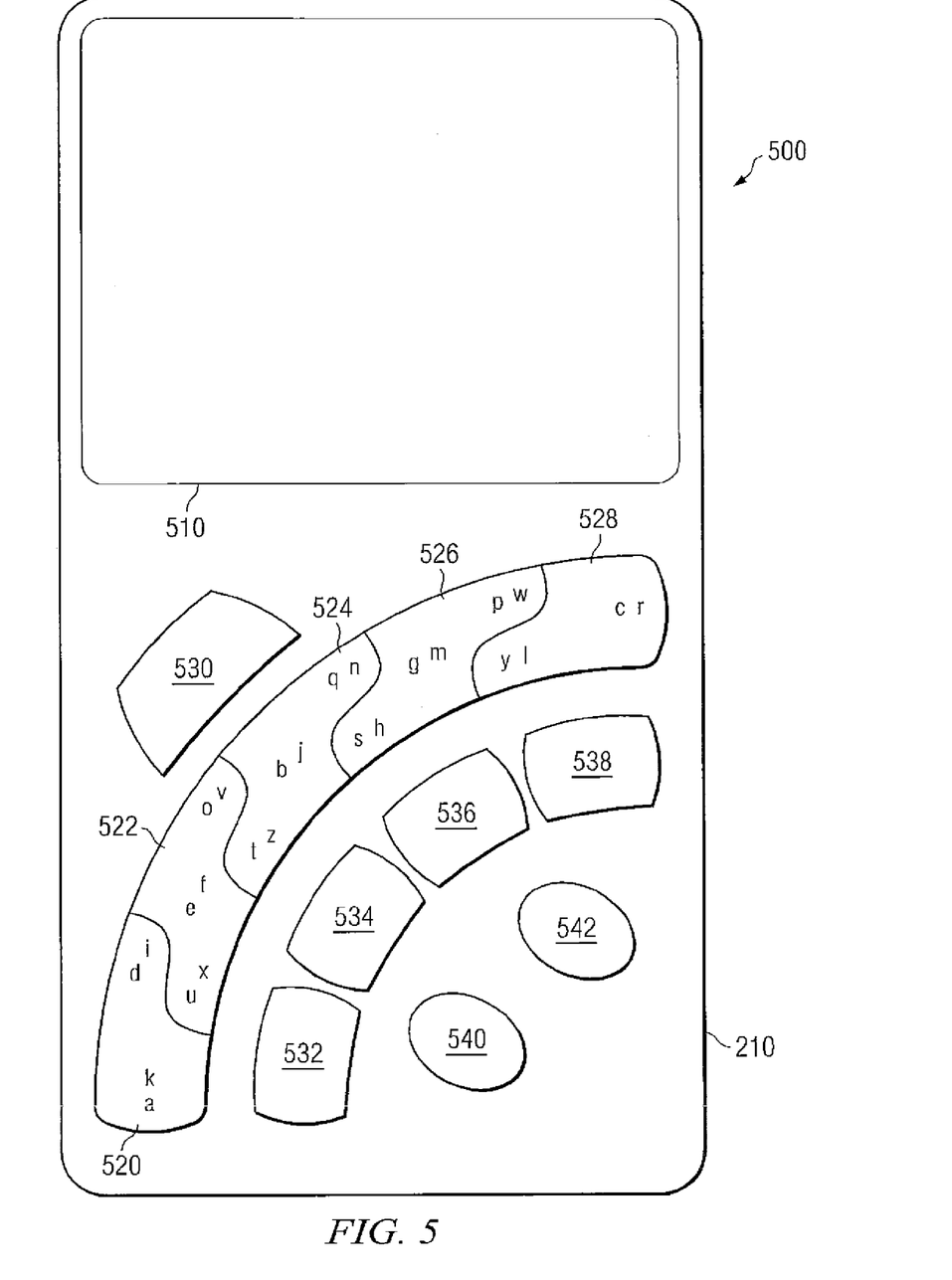
FIG. 5 represents one embodiment of a layout for employing zones for data entry on a device.

In FIG. 5 a detailed layout of a user interface 500 for use with embodiments of the present invention is presented. User interface 500 may contain principle sensor 210 and text window 510 for displaying information to the user. Principle sensor 210 may contain a set of zones 520-542. Each set of zones may present a set of symbols to the user. One set of zones 520-528 may correspond to characters of the English language, while other zones 530-542 may correspond to other functions depending on the context or architecture of the system with which user interface 500 is being utilized. These other functions may include command functions or menu functions.

Figures 6, 7:
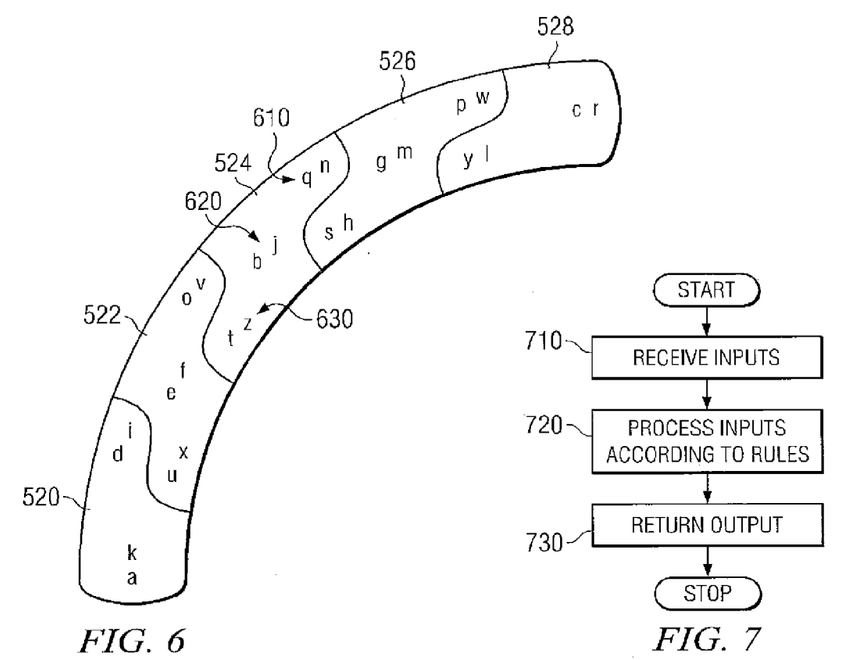
FIG. 6 represents in more detail some of the zones depicted in FIG. 5.
FIG. 7 includes one methodology for the processing of inputs by the core logic.

FIG. 6 depicts with more particularity the set of zones 520-528 which are associated with the English language.

Zones 520-528 may be laid out in a curve, such that zones 520-528 may be actuated with the thumb of the hand holding the device on which user interface 500 is utilized. In the embodiment depicted, zones 520-528 are arranged so they may be more efficiently actuated by a right-handed person. However, as discussed above, the landscape of the keys may be altered to any desired format, including formats which allow efficient actuation by the left hand. Each zone 520-528 contains up to six pairs of letters, grouped by key into upper pair 610, center pair 620 and lower pair 630. A user may actuate zones 520-528, principle sensor 210 will detect this actuation, pass messages corresponding to this actuation to keystroke logic 220, which will in turn translate these message to an Input message. Semantization logic 240 will then associate this Input message with the proper pair of letters.

For example, to select center pair 620 a user may touch the zone with the desired pair and release. To select any lower pair 630 a user may touch the zone with the desired pair and slide to any zone in the direction of the pair desired, the converse is true for selecting upper pair 610. To illustrate this example further, suppose a letter of the pair (s,h) is desired. This selection may be accomplished by touching the zone 526 containing (g,m) and sliding the movement until the pair (b,j). Note that the movement may stop in any zone 520-524 below zone 526 containing the desired pair (s,h). Semantization logic 240 may still resolve this movement into the desired pair (s,h).

Semantization logic 240 may receive a message from keystroke module 220 or additional sensors 212, and translate this message to a set of symbols or a set of commands depending on the context in which the message is received. In one particular embodiment, semantization logic 240 receives an Input message from keystroke logic 220 and translates this to a set of possible of symbols in accordance with a context. For example, a user actuation as described above with regards to FIG. 6 may be resolved to the letter pair (s,h). This resolution may then be passed to core logic 250. Semantization logic 240 may also be responsible for coordinating the input and output of the system in accordance with the context of the system.

In more specific embodiments, semantization module 240 may be responsible for translation of input messages to symbols or commands. This translation may be context dependent; the part of the context needed by semantization module may be called SemantifyContext. Semantization module 240 may respond to an input message representing symbols according to the context (SemantifyContext), with a SymbolMessage containing a set of symbols.

In the case where an input message represents a command, a message (CommandMessage) is emitted containing the unique identifier of the command. This unique identifier information can take a value which corresponds to the command desired, including: BackSpaceCmd, EndLexiconCmd, ItemSelectionCmd, NextCharCmd and PrevCharCmd. If the input message represents nothing with respect to the context (SemantifyContext), no action may be taken.

An input message can represent both a command and a set of symbols, in such a case a SymbolMessage may be sent out before the CommandMessage in order to display the set of symbols. Semantization module 240 may also be responsible for configuration of sensors 210, 212.

In some embodiments, messages from text element 280, menu element 282 or user context 290 are handled as follows:

A SelectItem triggers the emission of a CommandMessage with ItemSelectionCmd as command identifier and the argument of SelectItem.

If the last EndEdit message is more recent than the last StartEdit, the reception of a StartEdit triggers an EditText message. If the last StartEdit message is more recent than the last EndEdit, the reception of an EndEdit triggers the emission of a CommandMessage to the core logic 250 with argument EndLexiconCmd.

If the semantization module 240 is about to send a SymbolMessage when the last EndEdit message is more recent than the last StartEdit, semantization module 240 suspends the sending of the SymbolMessage, sends a message TextInputQuery to user context 290. If the next message received is EditText associated with a QueryFlag, semantization module 240 forwards the EditText message to core logic 250, and sends a suspended SymbolMessage.

A SemantifyContext may be the incremental result of a ContextGeneration function called with the last received message (either from architecture components or external) and the previous SemantifyContext as arguments. Between any two messages the SemantifyContext remains consistent.

Turning now to core logic 250 employed by semantization module 240, FIG. 7 depicts the basic methodology employed by core logic 250. Core logic 250 may take a set of inputs (block 710), apply processing rules (block 720) and return output (block 730) if necessary. Core logic 250 may take a set of inputs (block 710), these inputs may be generated internally by core logic 250, or may be from a user through principle sensor 210. Inputs may also be received by core logic 250 (block 710) from semantization module 240. As described above, in certain circumstances, semantization module 240 may generate a set of messages, depending on messages it has received and the context in which it is operating. Semantization module 240 may pass these messages to core logic 250, which may in turn take these messages as a set of inputs (block 710). In some embodiments, this input may be messages representing symbols or commands. Additionally, these messages may contain a prefix and a sequence of symbols related to the prefix.

Core logic 250 may take this set of inputs (block 710) and process them (block 720) according to a specific set of rules. This processing may include the formulation of a proposition, which may be a symbol, word, arbitrary sequence of characters, or any combination. This proposition may be associated with, or derived from, the disambiguation of an input, a predictive completion or prediction, or some combination of the two.

The rules which core logic 250 uses to process the set of inputs (block 720) may be designed to utilize language model 260 and usage model 280 to produce a set of candidates or predictions, and evaluate these candidates or predictions to generate a set of propositions, one or more of which may be presented to a user. In one embodiment, core logic 250 uses a scoring system to process the input (block 720). When core logic receives an input, if the input has no prefix, one or more propositions may be generated and evaluated according to a scoring system. However, if a prefix is present a sequence may be generated by appending the new input to the prefix and attempting to generate and evaluate one or more candidates based on this sequence. If no candidates can be generated, or the candidates generated do not surpass some threshold score a method may be provided to specify an input, otherwise the candidates are evaluated, predictions made, and a proposition may be formed and presented to a user based on this evaluation. Propositions may also be formulated in light of the disambiguation of the original input.

In certain embodiments, core logic 250 may formulate a candidate based on the input, determine a prediction from one or more of the candidates and formulate a proposition to present to the user from the set of candidates and predictions generated.

In some embodiments, rules and algorithms utilized by core logic 250 may be grouped into three categories, guessing rules, unambiguous rules, and internal rules. Unambiguous and guessing rules may be the main driver for core logic 250, while the internal rules may serve as the control functionality behind core logic 250, and may provide functionality responsible for the use of the guessing and unambiguous rule sets, the evaluation of these two rule sets, or responses from these rule sets. Additionally, the internal rules may be responsible for creating a prefix or proposition to be shown to a user.

These internal rules may work in tandem with the unambiguous rules and guessing rules depending on the functionality desired and the context in which the rules are being utilized. These rules may describe the behavior of the system in various contexts, and may be employed based on user desire or internal status. The unambiguous rules may describe behavior when the input received either from the user, or from semantization module 240, is ambiguous or there is no adequate candidate. In certain embodiments, these unambiguous rules employ only language model 260. Guessing rules may describe behavior when a relevant candidate can be found, and in embodiments may employ both language model 260 and usage model 280.

In one particular embodiment, core logic module 250 receives a CommandMessage or SymbolMessage from semantization module 240. Core logic 250 responds to those messages in accordance with a set of rules. When the core logic 250 rules indicate communication with a user, the semantization module 240 is used for delivery of the corresponding messages used for interface with the user.

In this embodiment, the rest of the core logic 250 rules are organized under three headings: 1) Guessing rules, which describe the core logic 250 behavior when the system has relevant propositions about input; 2) Unambiguous rules which describe how the system behaves when an input is ambiguous and the system can guess no relevant proposition about the input; and Internal rules, which contain several functions necessary to the evaluation of the guessing in the unambiguous rules.

Each of those rules is further detailed below.
The variables common to all the rules are:
CurrentRun a sequence of symbols.
CurrentPropositionSet a set of Propositions which may be stored in a data structure, which may be represented in code as:

```
typedef struct {
    Char*   run;
    Int     count :} Proposition;
```

InputSeqs is set sequence of set symbols.
EditionState can take two values: GuessingState and UnambiguousState.
FinalSeq is a sequence of symbols or Undefined.
CurrentSym is an integer.
When the core logic 250 receives an EditText message, it responds by:
Sending a StartEdit message to the text element.
If EditText prefix is empty then
    CurrentPropositionSet is set to an empty set;
    InputSeqs is set to an empty set;

The rule ShowPropositions is evaluated;
Else
NewPrefix is evaluated with argument the EditText prefix;
if CurrentPropositionSet is empty
   EditionState is set to UnambiguousState;
   InitUnambiguous is evaluated;
Else
   rule ShowPropositions is evaluated;

This algorithm initializes the state of core logic 250 for new input. The initiation is simple if there is no prefix. When a prefix is provided, the algorithm is designed to attempt to lookup the longest partial string being a possible completion of the prefix, utilizing language model 260. If language model 260 does not contain such a partial string, the algorithm switches to an unambiguous input mode.

i. Guessing Rules

The guessing rules apply when EditionState=GuessingState. This section of rules has a unique constant Add. There is a rule for each type of message arriving to core logic 250:

SymbolMessage has as list of symbols $S=(S_1,\ldots,S_t)$ with $t \geq 1$
  set InputSeqs to the concatenation of InputSeqs and (S)
  if CurrentRun is not empty, evaluate newPrefix(CurrentRun) and set CurrentRun to empty if CurrentPropositionSet is empty
    EditionState is set to UnambiguousState;
    InitUnambiguous is evaluated;
  Else
    If CurrentPropositionSet is empty then:
      L is the maximal set of non identical elements of type Node $\{L_1,\ldots,L_n\}$ where for each i part of $\{1,\ldots,n\}$:
        $L_i.c=S_j$ with j part of $\{1,\ldots,t\}$
        IsInSubtree ($L_i$.location,root)
      P is the minimal set of proposition $(P_1,\ldots,P_m)$ such as each i part of $\{1,\ldots,m\}$:
        $P_i.run=(L_i.c)$ and $P_i.count=L_i.count$
      PF=FilterProposition(P)
      If PF is empty then:
        set the EditionState to
        UnambiguousState evaluate InitUnambiguous
      else:
        set CurrentPropositionSet to PF evaluate ShowPropositions emit a UserNotify message with click as argument.
    else:
      The currentProposiontSet is the set $\{CP_1,\ldots,CP_m\}$.
      TempLocationSet is the maximal set of not identical Node elements
      $\{(L_1,X_1,Y_1,Count_1),\ldots,(L_n,X_n,Y_n,Count_n)\}$ where for each i part of $\{1,\ldots,n\}$:
        $L_i.c=S_j$ where j part of $\{1,\ldots,t\}$
        $Y_i$ is $CP_j$ with j in $\{1,m\}$
        $X_i$ is the longest sequence of Node $(N_1,\ldots,N_m)$ where:
          $(N_1.c,\ldots,N_m.c)$ forms a suffix not null of $Y_i$.run
          IsInSubtree ($N_1$,root)
          IsInSubtree ($L_i,N_m$)
        $Count_i$=ExtendProposition ($L_i,CP_j$.count)
      PF is the sequence of propositions $(PFP_1,\ldots,PFP_n)$ where for each i in $\{1,\ldots,n\}$:
        $PFP_i$.run is equal to the concatenation of $Y_i$.run and $L_i.c$
      PF2=FilterProposition(PF) if PF2 is empty then:
        set the EditionState to UnambiguousState evaluate InitUnambiguous
      else
        CurrentPropositionSet is to the set PF2 where for each i in $\{1,\ldots,n\}$:
        evaluate ShowPropositions emit a UserNotify message with click as argument.

Note: These rules for SymbolMessage may process user input, and try to find out which symbol sequence the user wants to input based on all the information received since the last EditText message, regardless of whether the user input is ambiguous or not.

CommandMessage

Depending on the command identifier contained in the message, the following actions are taken:

BackSpaceCmd.
  If InputSeqs is an empty sequence an EditStop message is sent to the UseContext
else
  Replay is the sequence
  (EditText( ),SymbolMessage($S_1$),...,
  SymbolMessage($S_{n-2}$)) along the input sequence $(S_1,\ldots,S_n)$. CurrentPropositionSet and InputSeqs are set to empty sets. The CoreLogic sends only to itself one after the other the elements of Replay as an argument of SymbolMessage and prevents himself to emit messages to other modules. Finally a SymbolMessage $(S_{n-1})$ is sent.

Note: These rules may make core logic 250 return to the state it was in before the last undiscarded SymbolMessage occurred.

EndLexiconCmd
  If CurrentRun is equal to Add Set the EditionState to UnambiguousState. Evaluate InitUnambiguous
  Else
    if CurrentRun is empty and
    CurrentPropositionSet is of the form (P, ... ) set CurrentRun to P.run
    Send a SubstituteText with argument CurrentRun An EditEnd message is send to the user context and to the Semantization module.
    Evaluate the StoreWord rule with as argument CurrentRun Note: If the user had selected a suggestion (Add) in the menu this rules switches core logic 250 rules to unambiguous mode else this rule cleans up the environment and takes account of the symbol sequence composed since the last StartEdit by the user.

ItemSelectionCmd
  If the highlighted item in menu is the command Add then:
    Set CurrentRun to Add Send a SubstituteText with argument P.c, while CurrentPropositionSet is (P ... )
  Else:
    Set the CurrentRun to the argument of PropositionSelect
    Send a SubstituteText message with the CurrentRun to the text field.
    Evaluate ShowRules Note: The user may select one of the propositions as the input he wants to appear in the TextElement.

Unambiguous Rules

The rules indexed under Guessing rules apply when EditionState=UnambiguousState.

InitUnambiguous
  Emit UserNotification(Error) set CurrentSym to 1
  InputSeqs has the form $(S_1,\ldots,S_n)$, set FinalSeq to a sequence of n elements Undefined
  evaluate ShowUnambiguous send StartAmbiguousInput to the Semantify module SymbolMessage
  has as sequence S as argument The InputSeqs has the form $(S_1, \ldots, S_n)$ set InputSeqs to the sequence $(S_1, \ldots, S_n, S)$
  The FinalSeq has the form $(F1, \ldots, Fn)$, set FinalSeq to the sequence $(F1, \ldots, Fn, \text{Undefined})$ evaluate ShowUnambiguous
CommandMessage
  BackSpaceCmd
    If InputSeqs is of the form (S):
      Send SubstituteText with as argument an empty sequence.
      Send an EditEnd message to the user context and to the Semantify module.
    Else:
      InputSeqs is of the form $(S_1, \ldots, S_n)$, set InputSeqs to $(S_1, \ldots, S_{n-1})$
      FinalSeq is of the form $(F_1, \ldots, F_n)$, set FinalSeq to $(F_1, \ldots, F_{n-1})$
  EndLexiconCmd send a SubstituteText message with the CurrentRun to the text field
    An EditEnd message is send to the user context and to the Semantify module.
    evaluate the StoreWord rule with as argument Current Run
  ItemSelectionCmd
    has as argument A.
    If A is equal to Done
      send a SubstituteText message with the CurrentRun to the text field
        An EditEnd message is send to the user context and to the Semantify module. evaluate the StoreWord rule with as argument CurrentRun
    Else:
      FinalSeq of the form $(F_1, \ldots, F_{CurretSym-1}, F_{CurrentSym}, F_{CurrentSym+1}, \ldots, F_n)$ is set to $(F_1, \ldots, F_{CurrentSym-1}, A, F_{CurrentSym+1}, \ldots, F_n)$ set CurrentSym to CurrentSym+1 Evaluate ShowUnambiguous
  PrevCharCmd
    if CurrentSym=1 emit UserNotify(Error) else CurrentSym=CurrenSym-1
  NextCharCmd
    if CurrentSym note equal to the length of InputSeq emit UserNotify(Error) else CurrentSym=CurrenSym+1 iii Internal Rules

The rules described in this section are explicitly called when evaluating "Unambiguous Rules" and "Guessing Rules"

ShowUnambiguous
  InputSeq is of the form $((S_{1,1}, \ldots, S_{1,M(1)}), \ldots, (S_{n,1}, \ldots, S_{n,M(n)}))$ where M(x) is the function that gives the length of $x^{th}$ element of InputSeq. FinalSeq is of the form $(F_1, \ldots, F_n)$ where each Fi is equal to Undefined or one of the elements of $(S_{i,1}, \ldots, S_{i,M(i)})$. C is one of the sequences $(C_1, \ldots, C_n)$ where for i in $\{1, \ldots, n\}$:
  If $F_i \neq$ Undefined then $C_i = F_i$ else Ci in $(S_{i,1}, \ldots, S_{i,M(1)})$ Quotation$_n$ maximal such:
    If Ci=L.c with IsInSubtree(L,root)
      Quotation$_1$=L.count else Quotation$_1$=0
      I in $\{2, \ldots, n\}$ Quotation$_n$=Accumulate (Quotation$_{i-1}$,L.count) where L=NodeFromPath $(C_{i-j}, \ldots, C_i)$ with J maximal
  set CurrentRun to c Send MenuSet message with argument $(S_{CurrentSym,1}, \ldots, S_{currenSym,M(1)}, \text{Done})$ Accumulate and Invariant may be defined in an implementation dependent manner, which will be apparent to those of skill in the are after reading this disclosure.
NewPrefix
  Has as argument s=$(C_1, \ldots, C_r)$
    Set InputSeqs to the sequence $(\{C_1\}, \ldots, \{C_r\})$
    P is the proposition such as:
      p.run=s, p.count=Invariant
      The longest sequence of $(N_1, \ldots, N_m)$ where:
        IsInSubtree($N_i, N_{i+1}$) with i in [1,m-1]$N_m$=root
        For each $N_i$ with i in [1,m-1],$N_i.c = C_{r-m+i}$
    If P exists
    Set CurrenPropositionSet to FilterProposition($\{P\}$)
    Else
    Set CurrentPropositionSet to empty
  ShowPropositions rule
  CurrentPropositionSet is of the form $\{P_1, \ldots, P_n\}$UP is the set where for i in $\{1, \ldots, n\}$:
    the sequence PredA
    $((PrA_1, CA_1, SymA_1), \ldots, (PrA_m, CA_m, SymA_m))$ is equal to GetSugest ions ($P_i$.run)
    the sequence PredB the minimal sequence $((PrB_1, CB_1, SymB_1), \ldots, (PrB_k, CB_k, SymB_k))$ with:
      for each j in $\{1, \ldots, k-1\} CB_j \geqq CB_{j+1}$ for each j in $\{1, \ldots, m\}$ if Relevant(PrA$_j$) Adjust(($PrA_j, CA_j, SymA_j$) is part of PredB
    U is equal to GetUNodeFromPath(Pi.run) if U is equal to UnknownPath then
      (($P_i$.run, $P_i$.c)) is part of UP
    else
      (Adjust(($P_i$.run, $P_i$.c,U)), $(PrB_1, CB_1, SymB_1), \ldots, (PrB_k, CB_k, SYmB_1))$ is part of UP
    if the menu is capable of showing a tree send SetMenu message with argument FilterSortExtentions(U), else:
    U is of the form $(((DS,DC)((PS,PC)((SS,SC) \ldots) \ldots) \ldots)$ U2 is the minimal list made of all the elements (DS,DC),(PS,PC) and (SS,SC) from U sorted along the DC,PC,SC
    send SetMenu message with argument U2
  Note: These rules may show the user all the relevant propositions currently evaluated for the disambiguisation/prediction for his input.

Adjust is implementation dependent and may relate the probabilities of predictions with the probabilities of the disambiguation propositions. This assures the user input is on average minimal.

ExtendProposition and FilterProposition are functions which may be implementation dependent. Filter Proposition may adjusts the threshold scoring level which determines the suggestion which are shown to the user must be. A higher threshold lowers the number of irrelevancies in the suggestions shown to the user.

StoreWord is also implementation dependent, and may be a holding place for a set of characters and may manage the amount of resources allocated to the LanguageModel and UsageModel structure. It may also control the models adaptation to the user's behavior to improver prediction/disambiguation for future use.

Figure 8:
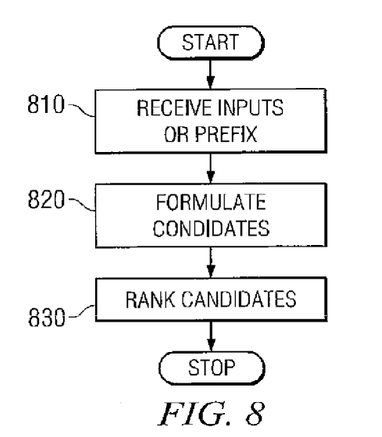
FIG. 8 includes one methodology for formulating candidates which may be used by the core logic during the processing of inputs.

Moving on to FIG. 8, one embodiment of a method for which core logic 250 may utilize language model 260 is depicted. Language model 260 may be an extension and improvement of the model depicted in an article by J. G. Cleary and J. H. Witten titled "Data Compression Using Adaptive Coding and Partial String Matching" published in Volume Com-32, Number 4 of the April 1984 issue of the IEEE Communications journal [Cleary1], incorporated fully herein by reference. Core logic 250 may employ language model 260 to receive a prefix or an input (block 810), formulate a set of candidates (block 820) and rank the set of candidates (block 830). Core logic 250 may receive a prefix and an input. A prefix may be an arbitrarily long set of symbols including an empty set, while an input may be an Input message of the type described with regard to semantization module 240. A set of candidates is then calculated (block 820) based on the prefix and the input. If the prefix is empty a candidate may be calculated, based solely on the input. If, however, the prefix is not an empty set, core logic 250 may attempt to lookup a set of string associated with the prefix and generate candidates (block 820) based on the prefix.

In some embodiments, core logic 250 may formulate these candidates (block 820) using language model 260, which may employ a tree structure to store arbitrarily long partial strings, and associated scores. In one embodiment, core logic 250 finds the longest string in language model 260 which is associated with the prefix. In associated embodiments, core logic 250 may use language model 260 to generate a list of candidates, this list may be a flat list or a nested list, depending on the implementation. Core logic may determine the score to associate with a candidate based on the score associated with each node of the tree implemented in language model 260. These scores may in turn be based on a probabilistic model.

It will be readily apparent to those of ordinary skill in the art that a wide variety of algorithms that may be used to calculate scores, and score candidates. For example, suppose the user wishes to enter the word "test". Using the layout described in FIG. 6, a user may select the pair (t,z), core logic 250 may then calculate the probability of "t" and the probability of "z". Next, the user will select the pair (e,f). Core logic 250 may use language model to calculate the score of the letters "e" and "f" following each of the letters associated with the set of previous candidates (t, z), and multiply it times the probability of each letter in the initial letter pair (t,z). In this manner, the probability of each sequence of two letters may be calculated.

In one particular embodiment, the structure for storing language model 260 of this type, and associated logic for processing input and calculating probabilities may be implemented as follows.

Language model 260 may be contained in structures of type LanguageModel represented as:

```
Typedef struct{
        Char            c;
        Int             counter;
        NodeStruct*     next;
        NodeStruct*     subtree;}NodeStruct
Typedef NodeStruct* Node;
Node root;
```

The Node structure may, in embodiments, be the structure of [Clearyl], modulo the syntax. Root may be core logic's entry point to language model 260.

The following properties and algorithms may be defined over the structure which supports language model 260:

IsInSubtree(Node $N_2$, Node $N_1$)
   If $N_1$.subtree is an invalid reference then
      IsInSubtree($N_2$,$N_1$) is false
   else
      If $N_2$=$N_1$.subtree then
         IsInSubtree($N_2$,$N_1$) is true
      Else
         IsInSubtree($N_2$,$N_1$)=IsNeighbor($N_2$,$N_1$.subtr ee)

Note: This property is true when $N_2$ is a son of $N_1$ and false in other cases IsNeighbor(Node $N_2$, Node $N_1$)
   If N1.next is an invalid reference to a node then
      IsNeighbor($N_2$,$N_1$) is false
   Else
      If $N_2$=$N_1$.next then
         IsNeighbor($N_2$,$N_1$) is true
      Else
         IsNeighbor($N_2$,$N_1$)=IsNeighbor($N_2$,$N_1$.next)

Figure 9:
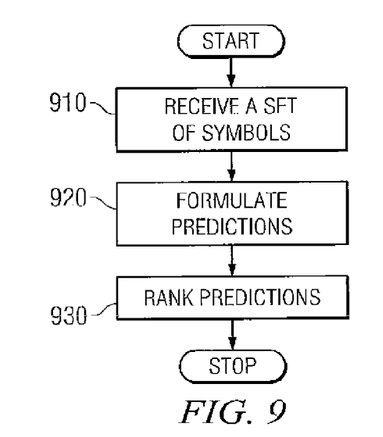
FIG. 9 includes one methodology of formulating predictions which may be used by the core logic.

Note: This property is true when $N_2$ is on the same level as $N_1$ in the tree and false in other cases NodeFromPath(($S_1$, . . . ,$S_n$))
   For each i in $\{1, \ldots ,n\}$ $S_i$ is a symbol N is the sequence of nodes ($N_1$, . . . ,$N_n$) where:
      for each i in $\{1, \ldots ,n\}$ $N_i$.c=$S_i$
      for each i in $\{1, \ldots ,n-1\}$ IsInSubtree($N_{i+1}$,$N_i$) is true
      IsInSubtree ($N_1$, root)
   if N exists NodeFromPath(($S_1$, . . . ,$S_n$)) sets values to $N_n$
      else it sets values to UnknownPath FIG. 9 depicts one embodiment of a method for which core logic 250 may utilize usage model 280. Core logic 250 may employ usage model 280 to receive a set of string (block 910), formulate a set of predictions (block 920) and rank the set of predictions (block 930). Core logic 250 may receive a set of symbols (block 910) which may consist of a set of strings, these strings may be a prefix and an input from a user. In some embodiments, these symbols may be derived or extracted by core logic 250 from a set of candidates assembled by, or returned to, core logic using language model 260.

This set of strings may be then be used to formulate a set of predictions (block 820) based on a string from the set of strings. Usage model 280 may determine a series of possible completions to the string based on statistical ordering of the possible completions.

In one embodiment, usage model 280 may use a tree structure to represent words, with each node of a tree containing a character. Each node which may designate the end of word may be demarcated, and a score associated with such a terminal node. It will be readily apparent to those of ordinary skill in the art the variety of scoring systems which may be used to assign a score.

Figure 10:
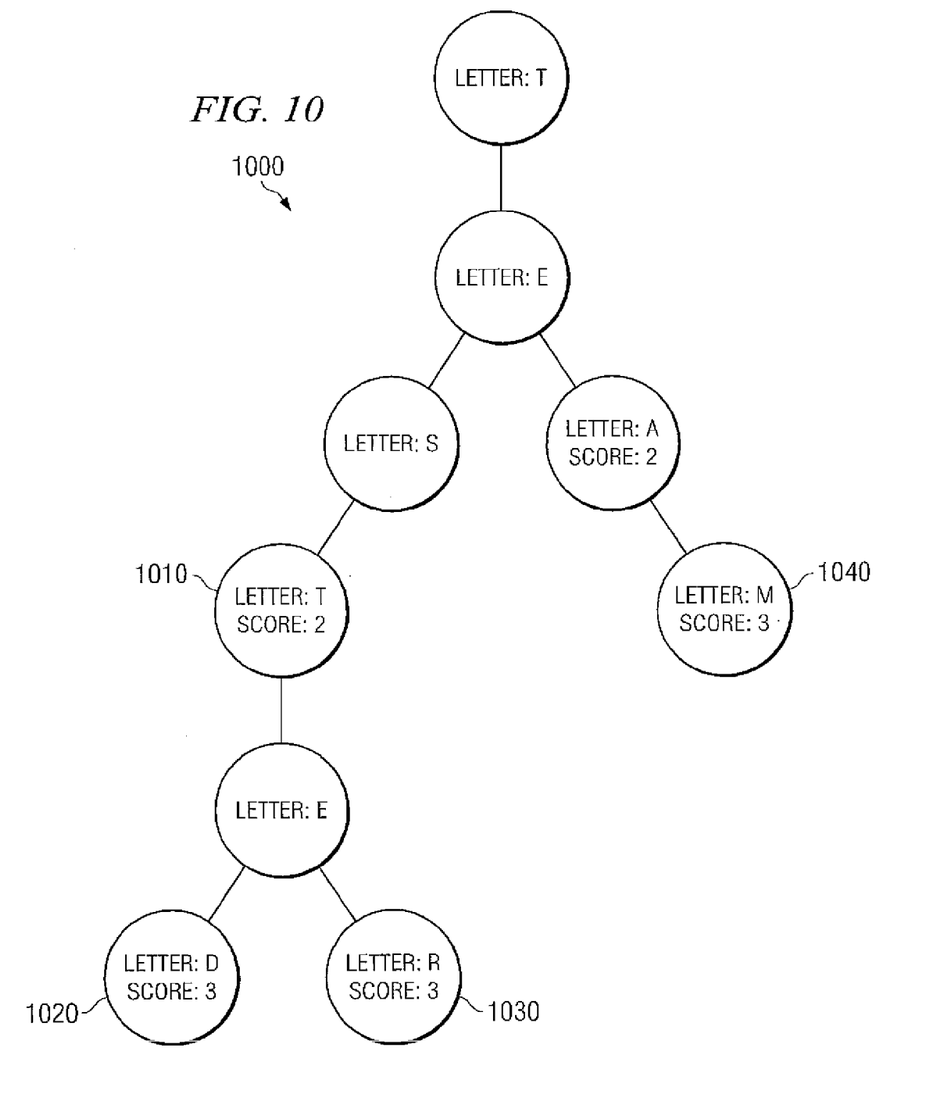
FIG. 10 includes a representation of an embodiment of a data structure for storing a language model.

To continue with the above example, suppose the string "te" is received by usage model 280. FIG. 10 depicts one representation of a tree which usage model 280 may use to complete the string. The string "te" may be used as index into a tree based representation of words 1000 which begin with "te", this tree 1000 may have terminal nodes 1010, 1020, 1030, 1040 which may contain indicia that these nodes offer possible completions to the string "te". This indicia may be a score associated terminal nodes 1010, 1020, 1030, 1040, or on some embodiments a boolean value. This score may be based on the number of nodes of the same depth which may complete the same string. The score may also be based on how many nodes in the same branch are not a completion for the string.

Based on the score associated with a node the node may be ranked (block 830) and the sequence of characters associated with each node in the path through tree 1000 to the node with the highest (or lowest) ranking may be returned. Referring to FIG. 10, if node 1020 has the highest score the sequence of characters "tested" may be returned. In other embodiments, each sequence of characters associated with terminal nodes in paths through the subtree may be returned along with the score of the associated terminal node.

Similarly, synonyms of the predictions, may be returned along with their associated scores. For example, in FIG. 10 if node 1020 has the highest score the sequence of characters "tested" may be returned. Additionally one or more synonyms may be returned. These synonyms may be determined based on their associated scores, and may be returned with or without these associated scores. The synonyms associated with a particular prediction may be stored in the terminal node corresponding to a prediction. To continue the example, terminal node 1020 corresponding to the prediction "tested" may store a variety of synonyms of "tested" including "tester", "testes", "tesla" etc. These synonyms of "tested" may be returned along with the sequence of symbols corresponding to the prediction "tested". In one particular embodiment, the structure for storing usage model 280 of this type, and associated logic for processing input and calculating scores or probabilities may be implemented as follows.

Typedef enum{true, false} Boolean;

```
Typedef struct {
    Char*           s;
    Int             count;
} SymListNode
Typedef struct {
    Char            c;
    Unode[ ]        sons;
    Boolean         terminal;
    Int             heads;
    Int             count;
    SymListNode[ ]  sym;
} Unode
uNode* Uroot;
```

Uroot may be the entry point for core logic 250 into usage model 280. The following properties over usage model 280 may be defined:

IsSon($U_1$:UPNode, $U_2$:UPNode)
  Is true if $U_1$ part if $U_2$.sons else
  IsSon($U_1$,$U_2$) is false
Note: IsSon denotes if $U_1$ is a direct son of $U_2$
GetUNodeFromPath(($C_1$, . . . ,$C_n$))
The sequence ($UP_1$, . . . ,$UP_N$)
  IsSon($UP_1$,URoot) is true for each i in {1, . . . ,n−1}
  IsSon($UP_{i+1}$,$UP_i$) is true for each i in {1, . . . ,n}
  $UP_i.c=C_i$
If $UP_n$ exists GetUNodeFromPath(($C_1$, . . . ,$C_n$)) values to $UP_n$ else values to UnknownPath
Note: GetUpFromPath returns the UNode in the Usage-Model associated with the sequence given as argument if it exists, else the constant UnknownPath is return.
GetSuggestions(C)
  C is a sequence of symbols UP is the result of GetUP-FromPath(C) UPS is the minimal set of UPNodes ($UPS_1$, . . . ,$UPS_n$) where for each i in {1, . . . ,n}:
    there is a sequence ($T_1$, . . . ,$T_q$) where:
      $T_1$ is equal to UP
      $T_q$ is equal to $UPS_{i\ q>1}$ for each j in {1, . . . ,q−1}
      IsSon($T_{j+1}$, $T_j$)
    $UPS_i$.terminal is true
  S is the sequence (($S_1$,$Count_1$,$Sym_1$), . . . , ($S_n$,$Count_n$, $Sym_1$) where for each i in {1, . . . ,n}:
    $UPS_x$=GetUPFromPath($S_i$) $UPS_x$.count=$Count_j$ and $Sym_j$=$UPS_x$.sym GetSugestion(C) values to S
Note: GetSuggestions retrieves words and their synonyms of a given prefix. Each word and synonym is associated with a score denoting their frequency of use in usage model 280.

Returning to FIG. 7, core logic may then formulate an output (block 730) based upon the processing of the input (block 720) discussed above. This output may be a sequence of characters or a sequence of characters with a set of menu options. This output (block 730) may then be presented to a user for further interaction. In one embodiment, core logic 250 may interact with semantization module 240 in order to present the formulated output (block 730) as a proposition to a user.

Note that not all of the tables, fields, or steps described are necessary, that tables, fields or steps may not be required, and that further tables, fields or steps may be added in addition to those illustrated. Additionally, the order in which each of the activities is listed is not necessarily the order in which they are performed. After reading this specification, a person of ordinary skill in the art will be capable of determining which tables, fields and orderings best suit any particular objective.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for an interface for data entry, comprising
detecting an input with respect to the interface wherein detecting the input comprises detecting a press in a first zone of a set of zones, wherein at least one of the set of zones is non-contiguous with at least one other of the set of zones and at least one of the set of zones differs in shape from at least one other of the set zones;
detecting a release in a second zone of the set of zones and detecting a movement between the press and release, wherein detecting the movement further comprises detecting entering or leaving one or more of the set of zones between the press in the first zone and the release in the second zone and contact is maintained with the interface between the press in the first zone and the release in the second zone; and
associating a semantic meaning with the input based on a set of semantic meanings associated with the first zone, wherein the semantic meaning is selected from the set of semantic meanings associated with the first zone based on the second zone.

2. The method of claim 1, wherein associating a semantic meaning with the input comprises:
grouping each of the set of zones into one of a set of selection zones, wherein each of the set of selection zones is associated with a corresponding one of the set of semantic meanings associated with the first zone; and
determining which of the set of selection zones the second zone is associated with.

3. The method of claim 2, wherein each of the set of semantic meanings is displayed on the interface in conjunction with the first zone, wherein each of the set of semantic meanings is displayed in a corresponding location of the first zone and each of the set of selection zones corresponds with one of the corresponding locations.

4. The method of claim 1, wherein the set of zones comprises a set of interkey zones and a set of key zones, wherein no two key zones are contiguous, and each key zone is contiguous with at least one interkey zone.

5. The method of claim 4, wherein the set of zones is arranged in a set of rows.

6. The method of claim 5, wherein the set of rows forms at least one concentric curve.

7. The method of claim 6, wherein each row has key zone at each end, and there is an interkey zone between each key zone in the row.

8. The method of claim 7, wherein each interkey zone overlaps with at least the two adjacent key zones with which it is contiguous.

9. The method of claim 8, wherein every part of each interkey zone is associated with one of the at least two adjacent key zones with which it is contiguous.

10. The method of claim 9, wherein the association is based on the movement.

11. The method of claim 1, further comprising forming a discrete message containing the first zone corresponding to the initial press and the second zone corresponding to the release.

12. The method of claim 11, associating the semantic meaning based on the discrete message.

13. A system for an interface for data entry, comprising
a sensor having a set of zones, wherein at least one of the set of zones is non-contiguous with at least one other of the set of zones, the sensor operable for:
detecting an input with respect to the interface wherein detecting the input comprises detecting a press in a first zone of the set of zones, detecting a release in a second zone of the set of zones and detecting a movement between the press and release, wherein detecting the movement further comprises detecting entering or leaving one or more of the set of zones between the press in the first zone and the release in the second zone and contact is maintained with the interface between the press in the first zone and the release in the second zone; and
a processor; and
processor executable instructions in a memory, the instructions operable for:
associating a semantic meaning with the input based on a set of semantic meanings associated with the first zone, wherein the semantic meaning is selected from the set of semantic meanings based on the second zone.

14. The system of claim 13, wherein associating a semantic meaning with the input comprises:
grouping each of the set of zones into one of a set of selection zones, wherein each of the set of selection zones is associated with a corresponding one of the set of semantic meanings associated with the first zone; and
determining which of the set of selection zones the second zone is associated with.

15. The system of claim 14, wherein each of the set of semantic meanings is displayed on the interface in conjunction with the first zone, wherein each of the set of semantic meanings is displayed in a corresponding location of the first zone and each of the set of selection zones corresponds with one of the corresponding locations.

16. The system of claim 13, wherein the set of zones comprises a set of interkey zones and a set of key zones, wherein no two key zones are contiguous, and each key zone is contiguous with at least one interkey zone.

17. The system of claim 16, wherein the set of zones are arranged in a set of rows.

18. The system of claim 17, wherein the set of rows forms at least one concentric curve.

19. The system of claim 18, wherein each row has key zone at each end, and there is an interkey zone between each key zone in the row.

20. The system of claim 19, wherein each interkey zone overlaps with at least the two adjacent key zones with which it is contiguous.

21. The system of claim 20, wherein every part of each interkey zone is associated with one of the at least two adjacent key zones with which it is contiguous.

22. The system of claim 21, wherein the association is based on the movement.

23. The system of claim 13, wherein the logic is operable to form a discrete message containing the first zone corresponding to the initial press and the second zone corresponding to the release.

24. The system of claim 23, wherein the logic is operable to associate the semantic meaning with the discrete message.

* * * * *